(12) United States Patent
Kim

(10) Patent No.: US 9,050,910 B2
(45) Date of Patent: Jun. 9, 2015

(54) CUP HOLDER TRAY FOR ARMREST OF AUTOMOBILE

(75) Inventor: Yong Dae Kim, Cheonan-si (KR)

(73) Assignee: NIFCO KOREA INC., Cheonan-si, Chungcheongnam-do (KR)

( * ) Notice: Subject to any disclaimer, the term of this patent is extended or adjusted under 35 U.S.C. 154(b) by 0 days.

(21) Appl. No.: 13/643,868

(22) PCT Filed: Apr. 26, 2011

(86) PCT No.: PCT/KR2011/003028
§ 371 (c)(1),
(2), (4) Date: Jan. 7, 2013

(87) PCT Pub. No.: WO2011/136539
PCT Pub. Date: Nov. 3, 2011

(65) Prior Publication Data
US 2013/0200239 A1   Aug. 8, 2013

(30) Foreign Application Priority Data

Apr. 28, 2010   (KR) .................. 10 2010 0039654

(51) Int. Cl.
*B60N 3/10*   (2006.01)
*B60N 2/46*   (2006.01)

(52) U.S. Cl.
CPC .............. *B60N 3/102* (2013.01); *B60N 2/4613* (2013.01); *B60N 2/468* (2013.01)

(58) Field of Classification Search
CPC ........... B60N 3/10; B60N 3/102; B60N 2/468
USPC ............. 248/311.2; 224/281, 926; 296/24.34; 220/737; 297/188.14–188.19; 292/1, 292/130, 131, 132, 136, 183, 184, 187, 189, 292/230, 234, 238, DIG. 4
See application file for complete search history.

(56) References Cited

U.S. PATENT DOCUMENTS

| | | | | |
|---|---|---|---|---|
| 2,649,270 | A | * | 8/1953 | Franks ........................ 248/311.2 |
| 2,683,640 | A | * | 7/1954 | Mangine ................... 248/231.71 |
| 4,660,871 | A | * | 4/1987 | Arakawa et al. ................ 292/81 |

(Continued)

FOREIGN PATENT DOCUMENTS

| | | |
|---|---|---|
| CN | 201078392 Y | 6/2008 |
| CN | 201336006 Y | 10/2009 |

(Continued)

OTHER PUBLICATIONS

KIPO, "International Search Report for PCT/KR2011/003028", Dec. 9, 2011.

(Continued)

*Primary Examiner* — Jonathan Liu
*Assistant Examiner* — Guang H Guan
(74) *Attorney, Agent, or Firm* — Manabu Kanesaka

(57) ABSTRACT

A cup holder tray for an armrest of an automobile has a tray placed and installed in the armrest of the automobile, and structured by a cup holder which protrudes forward by being unlocked from a lock member formed at a back of a main body with a one-touch operation when a cover provided in a front face is pressed. A stopper is inserted in and pivotally supported at a lid plate of the tray. When a position of the stopper is shifted between the lid plate and the cup holder by a rotation of the stopper due to the weight thereof, a backward movement of the cup holder is restricted or released.

4 Claims, 3 Drawing Sheets

(56) References Cited

U.S. PATENT DOCUMENTS

| | | | | |
|---|---|---|---|---|
| 4,906,044 | A | * | 3/1990 | Wilstermann ............ 297/188.15 |
| 5,002,074 | A | * | 3/1991 | Kimisawa ..................... 131/231 |
| 5,199,777 | A | * | 4/1993 | Taima et al. ................ 312/319.1 |
| 5,232,262 | A | * | 8/1993 | Tseng ...................... 297/188.17 |
| 5,620,228 | A | * | 4/1997 | Ito et al. ................... 297/188.17 |
| 5,683,126 | A | * | 11/1997 | De Vivo et al. ............... 292/230 |
| 5,692,718 | A | * | 12/1997 | Bieck ......................... 248/311.2 |
| 5,810,434 | A | * | 9/1998 | Thompson et al. ....... 297/188.19 |
| 6,779,770 | B2 | * | 8/2004 | Kaupp ........................ 248/311.2 |
| 6,802,550 | B1 | | 10/2004 | Griggs, Jr. et al. |
| 6,843,528 | B2 | * | 1/2005 | Glynn et al. ............. 297/188.01 |
| 6,860,457 | B2 | * | 3/2005 | Then et al. ................. 248/311.2 |
| 6,923,517 | B2 | * | 8/2005 | Yamamoto ................... 312/332 |
| 7,104,609 | B2 | * | 9/2006 | Kim ......................... 297/411.35 |
| 7,226,138 | B2 | * | 6/2007 | Katagiri ..................... 312/319.1 |
| 7,607,727 | B2 | * | 10/2009 | Park ........................ 297/188.19 |
| 2013/0200239 | A1 | * | 8/2013 | Kim, Yong Dae ......... 248/311.2 |

FOREIGN PATENT DOCUMENTS

| | | |
|---|---|---|
| GB | 2397049 A | 7/2004 |
| JP | 2005-008006 A | 1/2005 |
| JP | 2006-141855 A | 6/2006 |
| JP | 2006-143105 A | 6/2006 |

OTHER PUBLICATIONS

China Patent Office, "Office Action for CN 201180021248.0," May 23, 2014.

* cited by examiner

CUP HOLDER TRAY FOR ARMREST OF AUTOMOBILE

BACKGROUND OF THE INVENTION

The present invention relates to a cup holder tray for an armrest of an automobile. More specifically, in the cup holder tray installed in the armrest which is selectively used by deploying it from the rear seat, or by housing it in the rear seat, a stopper is provided, which restricts a cup holder from protruding in a state wherein the armrest is housed in the rear seat, so as to improve a merchantability and a convenience.

DESCRIPTION OF RELATED ART

Generally, inside an automobile, there is installed the armrest which supports passenger's arms for passenger's convenience. Namely, at the center of a backseat of the rear seat, there is installed the armrest housed inside the seat, and supporting arms by deploying the armrest in such a way as to protrude from the seat according to the needs of a passenger.

In the armrest installed in the aforementioned rear seat, there is formed a convenient device such as the cup holder tray, an operating portion, and the like, which improves the convenience of a passenger who sits in the seat so as to allow the passenger to ride comfortably.

Also, in the armrest installed in the rear seat, generally, there are formed a storage box housing small personal effects such as accessories and the like, and a control portion for operating a radio, a television set, and the like, and the other electrical devices in an upper portion of a main body, and there is provided the cup holder tray which can protrude in front of the armrest.

SUMMARY OF THE INVENTION

Problems to be Solved by the Invention

Although the conventional cup holder tray placed in such a way as to protrude in front of the armrest has been manufactured with a one-touch-operation type in order to improve the convenience, there has been a negative effect of an occurrence of malfunction since a front face cover of the tray tends to be pressed in a process of housing the armrest inside the rear seat, or deploying the armrest from the rear seat by grasping an end portion of the armrest.

Namely, in the process of housing the armrest, when the passenger has mistakenly pressed the front face cover, and the cup holder housed in the tray has protruded, there has been an inconvenience that the passenger has to house the armrest by inserting the cup holder again.

Therefore, in order to solve the aforementioned inconvenience, a separate locking device has been provided in the tray with the one-touch-operation type. However, there has been a problem that components composing the locking device are complicated, and require a manufacturing cost.

The present invention is made in view of the problems of such a conventional cup holder tray for the armrest, and an object of the present invention is to provide a cup holder tray for an armrest of an automobile rear seat which prevents a one-touch actuation of the cup holder in a vertical state of the armrest using a stopper which is supported by an axis on and connected to a lid plate of the tray, and which allows the cup holder to be pulled out of the tray with one-touch push by the stopper being automatically released by the weight thereof in a horizontal state.

Another object of the present invention is to provide the cup holder tray for the armrest of the automobile rear seat which can prevent the malfunction of the front face cover by a one-touch operation using the stopper rotatably connected by the axis at a back of the lid plate of the tray, and which can reduce the manufacturing cost while simplifying the components.

Means for Solving the Problems

In order to achieve the aforementioned object, the present invention comprises a tray 20 which is placed and installed in an armrest 10 of a rear seat 1, and is structured by a cup holder 23 which protrudes forward by being unlocked from a lock member 21 formed at a back of a main body with a one-touch operation when a cover 22 provided in a front face is pressed.

The tray 20 is structured so as to restrict or release a backward movement of the cup holder 23 while a stopper 30 is inserted and supported by an axis at a lid plate 24 of the tray 20, and a position of the stopper 30 is being converted by a rotation of the stopper 30 due to the weight thereof between the lid plate 24 and the cup holder 23.

Also, in the stopper 30, at the center of a turning axis 31 which is connected to an axis groove 24b provided at a back of the lid plate 24, there is formed to protrude a locking piece 32 positioned between the lid plate 24 and the cup holder 23. From both sides of the locking piece 32, there is integrally molded a rotation weight 33 in a lower portion, and in an upper portion of the turning axis 31 of the stopper 30, there is molded to protrude a locking protrusion 34 so as to complete the stopper 30.

Then, in the rotation weight 33 of the stopper 30, there is formed a weight body 33a in such a way as to be detachably banded together.

Effect of the Invention

According to the present invention comprising such structure, in a state wherein the armrest is housed inside the rear seat, even if the front face cover of the tray is pressed, the cup holder is not pulled out, and only in a state wherein the armrest is deployed, the cup holder is pulled out with the one-touch operation so as to prevent a malfunction of a product and to increase a convenience.

Also, due to a simple assembly process where the stopper is integrally molded and placed on the tray, the cup holder can be prevented from being pulled out, and despite a simple structure, the present invention is very useful for being capable of reducing a manufacturing cost.

DETAILED DESCRIPTION OF THE INVENTION

Hereinafter, a structure and an actuation example of the present invention for achieving the aforementioned object will be explained with reference to attached drawings.

A cup holder tray for an armrest of an automobile rear seat according to the present invention is invented in order to improve a merchantability and a convenience by providing a stopper, which prevents a cup holder from protruding in a state wherein the armrest is housed in the rear seat, in the cup holder tray installed in the armrest which is selectively used by deploying it from the rear seat, or by housing it in the rear seat.

Figure 1:
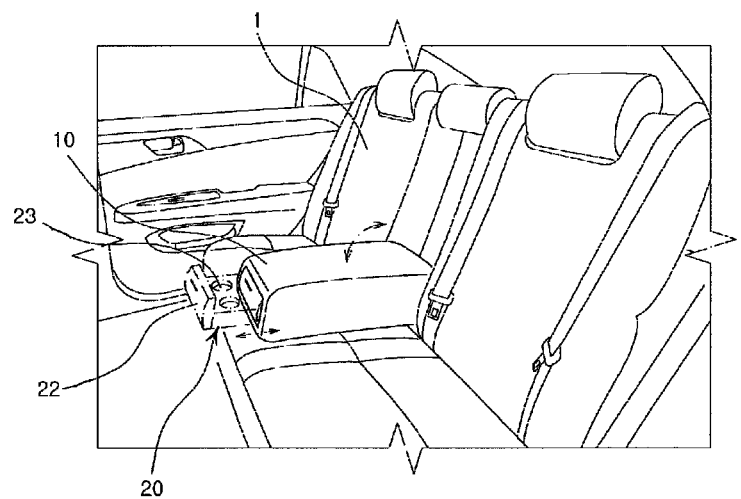
FIG. 1 is a perspective view showing a state wherein a cup holder tray according to the present invention is installed in an armrest of a rear seat.
Figure 2:
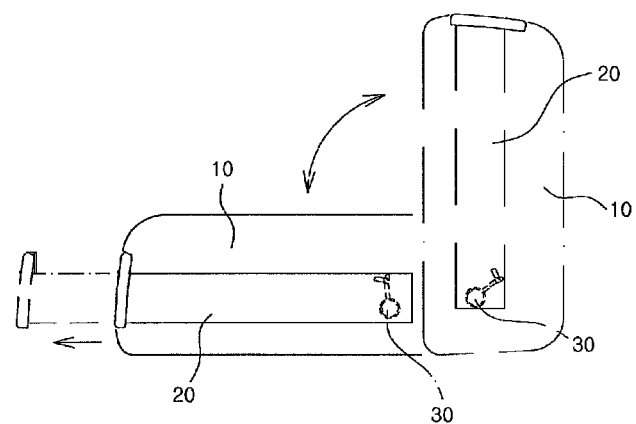
FIG. 2 is a side view showing an embodiment of the present invention by a rotation of the armrest.

Namely, as shown in FIG. 1 and FIG. 2, a cup holder tray 20 placed and installed in an armrest 10 of a rear seat 1 includes a structure in which a cup holder 23 housed inside the tray comes to an unlocked state with a one-touch operation by pressing a lock member 21 formed at a back thereof so as to be pulled out forward when a front face cover 22 provided in a front face of a main body is pressed. The aforementioned lock member 21 formed at the back of the tray is well known in the art, such as U.S. Pat. Nos. 5,620,228, 4,660,871, 5,199,777 and 5,002,074.

In the cup holder tray 20 which is actuated with the one-touch operation as mentioned above, it is necessary for a movement space required for a backward movement of the main body of the cup holder 23 in order to press the lock member 21, and in the space, a stopper 30 which can restrict a movement of the cup holder 23 is inserted in a lid plate 24 of the tray 20, and is connected by an axis.

Figure 3:
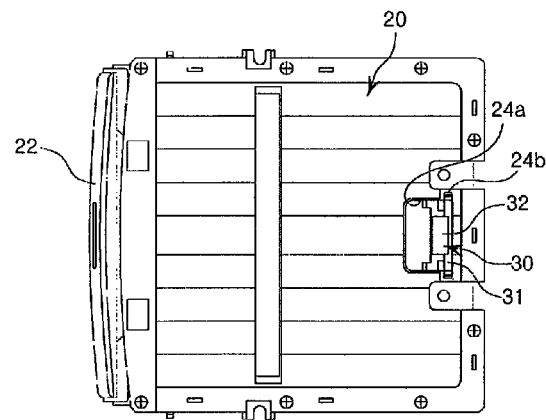
FIG. 3 is a plan view showing a state wherein a stopper is connected to a lid plate of the cup holder tray.

Namely, as shown in FIG. 3, in the upper-portion lid plate 24 of the tray 20, there are formed a fitting portion 24a and an axis groove 24b at a back of the main body. Through the fitting portion 24a, a locking piece 32 of the stopper 30 is inserted inside the tray 20, and a turning axis 31 is rotatably connected to the axis groove 24b.

Figure 4:
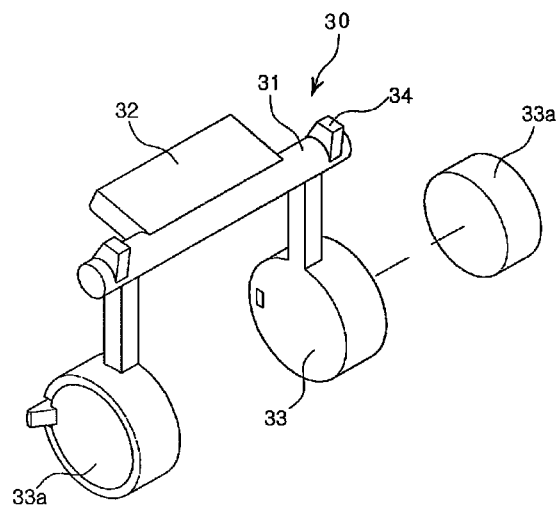
FIG. 4 is a perspective view of the stopper placed in the cup holder tray according to the present invention.

As shown in FIG. 4, in the stopper 30, there is formed to protrude the locking piece 32 positioned in a space between the lid plate 24 and the cup holder 23 at a center portion of the turning axis 31 connected to the axis groove 24b. From both sides of the locking piece 32, there is integrally molded a rotation weight 33 in a lower portion.

Also, in an upper portion of the turning axis 31 of the stopper 30, there is formed to protrude a locking protrusion 34. When the turning axis 31 rotates by the weight of the rotation weight 33, the locking protrusion 34 is locked in an inner wall of the fitting portion 24a of the lid plate 24 so as to prevent the rotation weight 33 from rotating beyond an axis center line.

Hereinafter, as mentioned above, an actuation process where the stopper 30 is connected to the lid plate 24, and restricts the cup holder 23 from being pulled out, will be explained.

Figure 5:
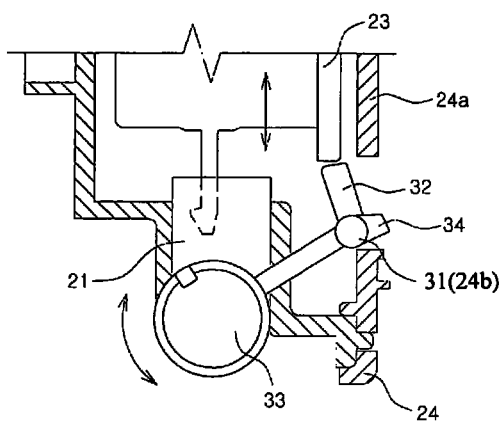
FIG. 5 is an enlarged cross-sectional view showing a state wherein the stopper is positioned at a back of a cup holder.

As shown in FIG. 5, in a state wherein the armrest 10 is risen and housed in the rear seat, a state, wherein the rotation weight 33 of the stopper 30 supported by the axis at the lid plate 24 is laid on the inner wall of the tray 20 by the weight of the rotation weight 33, is maintained, and the locking piece 32 is positioned at the back of the cup holder 23.

Namely, in a state wherein the rotation weight 33 integrally molded in the stopper 30 is placed on the inner wall of the tray 20, the locking piece 32 is laid in a position connecting between the cup holder 23 and the fitting portion 24a of the lid plate 24.

Therefore, as mentioned above, in a state wherein the locking piece 32 of the stopper 30 is positioned at the back of the cup holder 23, when the front face cover 22 is pressed, the locking piece 32 abuts against the cover 22, and the cup holder 23 does not move internally. As a result, since a locking with the lock member 21 is not released, the cup holder 23 can be prevented from being pulled out.

Figure 6:
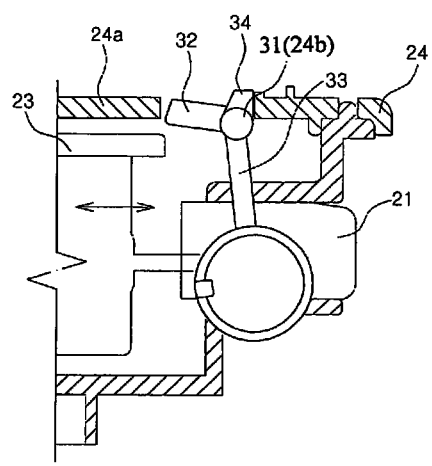
FIG. 6 is an enlarged cross-sectional view showing a state which can pull out the cup holder by deploying the armrest.

Then, as shown in FIG. 6, when the armrest 10 is positioned in a deployed state, while the rotation weight 33 is interiorly rotating by the weight thereof at the center of the turning axis 31 supported by the axis at the lid plate 24, the integrally formed locking piece 32 rotates to the upper portion.

At that time, in order for the rotation weight 33 not to rotate beyond the center line of the turning axis 31, the locking protrusion 34 formed in the turning axis 31 is made so as to be locked in a lateral face of the fitting portion 24a of the lid plate 24. Accordingly, due to a rotation of the armrest 10, the stopper 30 can easily respond to a restraint or a release of the cup holder 23.

Namely, the locking protrusion 34 formed in the stopper 30 is locked in the fitting portion 24a, and a rotation angle is restricted so as to prevent the rotation weight 33 from interiorly rotating excessively. At the same time, when the armrest 10 is risen, the rotation weight 33 easily rotates to the lower portion by the weight thereof so as to prevent a malfunction of the stopper 30.

Also, in the rotation weight 33 of the stopper 30, it is also desirable that a separate weight body 33a which is a metal material with a high specific gravity is formed in such a way as to be detachably banded together.

Thus, when the locking piece 32 of the stopper 30 rotates exteriorly while the armrest 10 is being deployed, there is ensured a movable space inside the cup holder 23. Accordingly, the front face cover 22 is pressed, so that the locking with the lock member 21 is released so as to be capable of pulling out with the one-touch operation.

Therefore, even with a simple structure connecting the lid plate 24 and the stopper 30 to the main body of the conventional tray 20, the malfunction of the cup holder 23 can be prevented.

The above-explained present invention is not limited to the embodiment and the drawings described hereinabove, and it is obvious to those ordinarily skilled in the art of the invention that various replacements, transformations, and modifications may be made without departing from the technical scope of the present invention.

What is claimed is:

1. A cup holder tray assembly for an armrest of an automobile, comprising:
    a lid plate configured to be installed in the armrest of the automobile and having a space and an axis groove arranged in a back thereof;
    a tray disposed under the lid plate to move forward relative to the lid plate and having a cup holder therein;
    a lock member disposed at a rear of the tray to lock or unlock the tray;
    a cover provided in a front face of the tray; and
    a stopper pivotally supported at the lid plate to rotate between a restricting position in which the stopper restricts a backward movement of the tray to maintain a locking between the tray and the lock member, and a releasing position in which the stopper allows the backward movement of the tray to release the locking of the lock member and the tray, the stopper including
        a cylindrical turning axis disposed in the axis groove to rotate between the restricting position and the releasing position, two rotation spindles each being formed at each end portion of the turning axis in an axial direction and extending downwardly from an outer surface of the turning axis, two locking protrusions each formed at each of the end portions in the axial direction of the turning axis and extending radially outwardly from the outer surface of the turning axis in a direction substantially opposite the rotation spindles, and a locking piece protruding radially outwardly from the outer surface of the turning axis between the two locking protrusions and the two rotation spindles in a direction different from the direction of the two locking protrusions, wherein the tray and the stopper are arranged such that when the tray is in a first position where the cup holder is usable, the stopper is in the releasing position in which the locking piece is fit in the space of the lid plate, and the two locking protrusions are disposed in the space and abut against an end of the space to allow an unlocking of the tray; and when the tray is in a second position where the cup holder is not usable, the stopper is located in the restricting position in which the locking piece is moved from the space by the rotation spindles and is located behind the tray to prevent movement of the tray to thereby maintain the locking between the tray and the lock member.

2. A cup holder tray assembly according to claim 1, wherein the stopper further comprises a weight body detachably attached in each of the rotation spindles of the stopper.

3. A cup holder tray assembly according to claim 1, further comprising a latch member arranged on the tray to lock with the lock member disposed at the rear of the tray.

4. A cup holder tray assembly according to claim 1, wherein the tray and the stopper are arranged such that when the tray is in the second position, the two locking protrusions are disposed in the space without abutting against the end of the space.

\* \* \* \* \*